(12) United States Patent  
Benantar

(10) Patent No.: US 8,195,933 B2  
(45) Date of Patent: Jun. 5, 2012

(54) METHOD AND SYSTEM FOR COMPUTING DIGITAL CERTIFICATE TRUST PATHS USING TRANSITIVE CLOSURES

(75) Inventor: Messaoud Benantar, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 4229 days.

(21) Appl. No.: 10/045,112

(22) Filed: Jan. 10, 2002

(65) Prior Publication Data

US 2003/0130947 A1 Jul. 10, 2003

(51) Int. Cl.
- H04L 29/06 (2006.01)
- H04L 9/00 (2006.01)
- H04L 9/08 (2006.01)

(52) U.S. Cl. .................. 713/156; 380/277; 380/280

(58) Field of Classification Search .................. 713/156
See application file for complete search history.

(56) References Cited

U.S. PATENT DOCUMENTS 6,134,550 A * 10/2000 Van Oorschot et al. .......... 707/9
2002/0087859 A1* 7/2002 Weeks et al. .................. 713/156

* cited by examiner

Primary Examiner — Shin-Hon Chen
(74) Attorney, Agent, or Firm — Hamilton & Terrile, LLP; Michael Rocco Cannatti

(57) ABSTRACT

A method, system, apparatus, and computer program product are presented for managing digital certificates. When entities need to engage in a secure transaction or open a secure communication link, they may exchange digital certificates in order to provide a public key or reference information to a public key for the opposing entity, thereby requiring validation of a received certificate. Rather than construct a trust path for each validation event, hierarchical certifications and peer-to-peer cross-certifications among a set of certificate authorities are represented by a set of trust relations, and trust path information is generated using a transitive closure computation and an "all pairs shortest paths" computation over the set of trust relations and then incrementally updated as the set of trust relations changes. Computations related to trust paths can be delegated to a central agent in a trust web.

12 Claims, 7 Drawing Sheets

METHOD AND SYSTEM FOR COMPUTING DIGITAL CERTIFICATE TRUST PATHS USING TRANSITIVE CLOSURES

BACKGROUND OF THE INVENTION

1. Field of the Invention

The present invention relates to an improved data processing system and, in particular, to a method and apparatus for multicomputer data transferring. Still more particularly, the present invention relates generally to computer-to-computer authentication.

2. Description of Related Art

Distribution of information across the Internet has continued to increase dramatically. Web-based and Internet-based applications have now become so commonplace that when one learns of a new product or service, one assumes that the product or service will incorporate Internet functionality into the product or service. New applications that incorporate significant proprietary technology are only developed when an enterprise has a significantly compelling reason for doing so. Many corporations have employed proprietary data services for many years, but it is now commonplace to assume that individuals and small enterprises also have access to digital communication services. Many of these services are or will be Internet-based, and the amount of electronic communication on the Internet is growing exponentially.

One of the factors influencing the growth of the Internet is the adherence to open standards for much of the Internet infrastructure. Individuals, public institutions, and commercial enterprises alike are able to introduce new content, products, and services that are quickly integrated into the digital infrastructure because of their ability to exploit common knowledge of open standards.

Concerns about the integrity and privacy of electronic communication have also grown with adoption of Internet-based services. Various encryption and authentication technologies have been developed to protect electronic communication. For example, an open standard promulgated for protecting electronic communication is the X.509 standard for digital certificates.

An X.509 digital certificate is an International Telecommunications Union (ITU) standard that has been adopted by the Internet Engineering Task Force (IETF) body. It cryptographically binds the certificate holder, presumably the subject name within the certificate, with its public cryptographic key. This cryptographic binding is based on the involvement of a trusted entity within the Internet Public Key Infrastructure for X.509 certificates (PKIX) called the certifying authority (CA). As a result, a strong and trusted association between the certificate holder and its public key can become public information yet remain tamper-proof and reliable.

An important aspect of this reliability is a digital signature that the certifying authority stamps on a certificate before it is released for use; a certifying authority certifies a holder's public key by cryptographically signing the certificate data structure. Subsequently, whenever the certificate is presented to a system for use of a service, its signature is verified before the subject holder is authenticated. After the authentication process is successfully completed, the certificate holder may be provided access to, i.e. authorized for, certain information, services, or other controlled resources.

Although PKI technology provides robust standards for secure communication, PKI technology has been adopted slowly. For example, in order to be truly useful, digital certificates must be widely available. To this end, the Certificate Management Protocol (CMP) of PKIX facilitates the publication of an issued certificate in an LDAP-based (Lightweight Directory Protocol) directory so that it can be retrieved for use by applications and security protocols. Immediate publishing of certificates to a public repository results in the immediate availability of those certificates for security-conscious services.

Another reason for the slow deployment of PKI technology is the complexity of PKI management. For example, two entities that exchange digital certificates during a secure transaction need to validate each other's digital certificate via a trust path. Administrative management and processing of information associated with these trust paths can be quite complex, and the deployment of a standard public key infrastructure is already hampered by the cost of the complexity of the public key infrastructure.

Therefore, it would be advantageous to have a method and system that simplifies the administrative processing associated with the trust paths that are required for valid use of digital certificates.

SUMMARY OF THE INVENTION

A method, system, apparatus, and computer program product are presented for managing digital certificates. When entities need to engage in a secure transaction or open a secure communication link, they may exchange digital certificates in order to provide a public key or reference information to a public key for the opposing entity, thereby requiring validation of a received certificate. Rather than construct a trust path for each validation event, hierarchical certifications and peer-to-peer cross-certifications among a set of certificate authorities are represented by a set of trust relations, and trust path information is generated using a transitive closure computation and an "all pairs shortest paths" computation over the set of trust relations and then incrementally updated as the set of trust relations changes. Computations related to trust paths can be delegated to a central agent in a trust web.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

The present invention is directed to the management of digital certificates. In general, the devices that may comprise or relate to the present invention include a wide variety of data processing technology. Therefore, as background, a typical organization of hardware and software components within a distributed data processing system is described prior to describing the present invention in more detail.

Figure 1A:
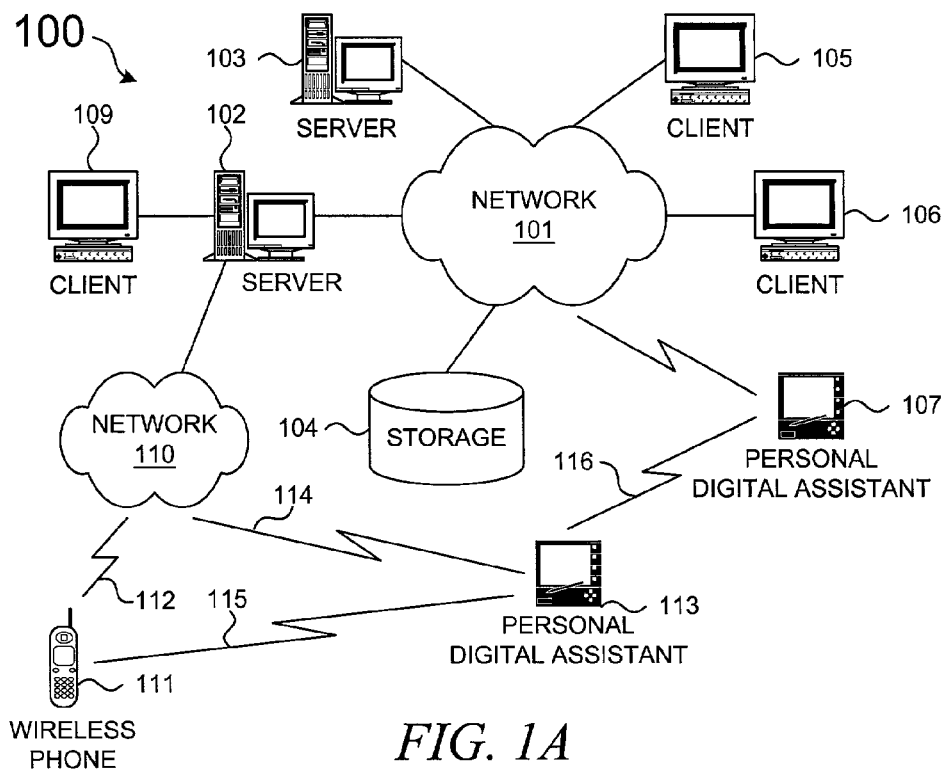
FIG. 1A depicts a typical distributed data processing system in which the present invention may be implemented.

With reference now to the figures, FIG. 1A depicts a typical network of data processing systems, each of which may implement the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
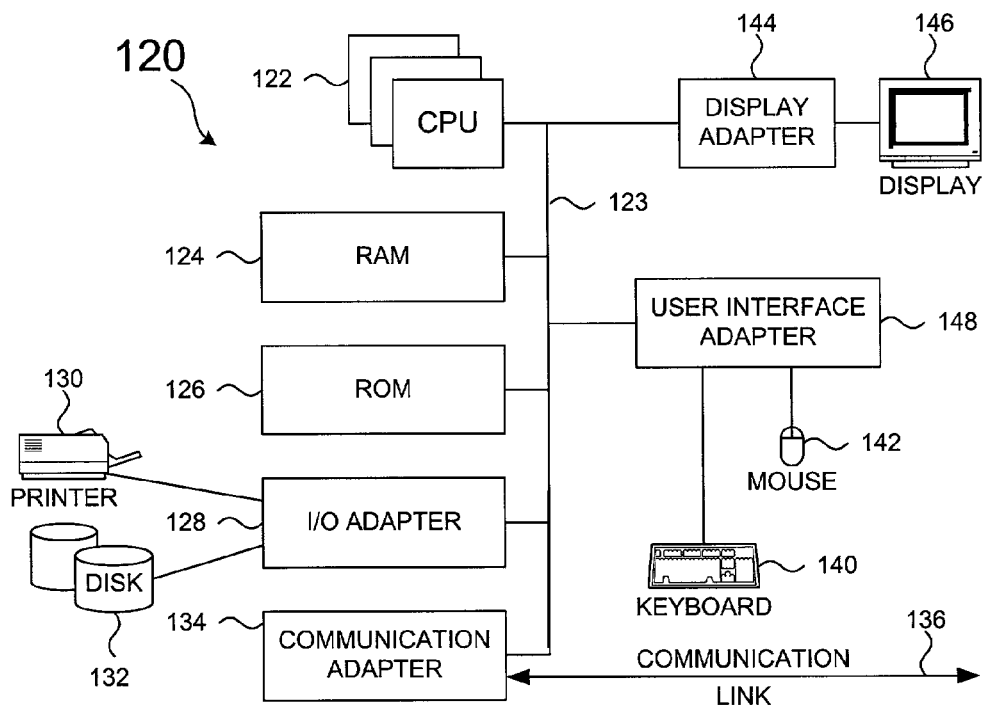
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. In other words, one of ordinary skill in the art would not expect to find similar components or architectures within a Web-enabled or network-enabled phone and a fully featured desktop workstation. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files. Hence, it should be noted that the distributed data processing system shown in FIG. 1A is contemplated as being fully able to support a variety of peer-to-peer subnets and peer-to-peer services.

The present invention may be implemented on a variety of hardware and software platforms, as described above. More specifically, though, the present invention is directed to a use of digital certificates within a distributed data processing environment. To accomplish this goal, the present invention processes information related to digital certificates in a novel manner. Before describing the present invention in more detail, though, some background information about digital certificates is provided for evaluating the operational efficiencies and other advantages of the present invention.

Digital certificates support public key cryptography in which each party involved in a communication or transaction has a pair of keys, called the public key and the private key. Each party's public key is published while the private key is kept secret. Public keys are numbers associated with a particular entity and are intended to be known to everyone who needs to have trusted interactions with that entity. Private keys are numbers that are supposed to be known only to a particular entity, i.e. kept secret. In a typical public key cryptographic system, a private key corresponds to exactly one public key.

Within a public key cryptography system, since all communications involve only public keys and no private key is ever transmitted or shared, confidential messages can be generated using only public information and can be decrypted using only a private key that is in the sole possession of the intended recipient. Furthermore, public key cryptography can be used for authentication, i.e. digital signatures, as well as for privacy, i.e. encryption.

Encryption is the transformation of data into a form unreadable by anyone without a secret decryption key; encryption ensures privacy by keeping the content of the information hidden from anyone for whom it is not intended, even those who can see the encrypted data. Authentication is a process whereby the receiver of a digital message can be confident of the identity of the sender and/or the integrity of the message.

For example, when a sender encrypts a message, the public key of the receiver is used to transform the data within the original message into the contents of the encrypted message. A sender uses a public key to encrypt data, and the receiver uses a private key to decrypt the encrypted message.

When authenticating data, data can be signed by computing a digital signature from the data and the private key of the signer. Once the data is digitally signed, it can be stored with the identity of the signer and the signature that proves that the data originated from the signer. A signer uses a private key to sign data, and a receiver uses the public key to verify the signature.

The present invention is directed to a form of digital certificate management. A certificate is a digital document that vouches for the identity and key ownership of entities, such as an individual, a computer system, a specific server running on that system, etc. Certificates are issued by certificate authorities. A certificate authority (CA), also known as a certification authority or a certifying authority, is an entity, usually a trusted third party to a transaction, that is trusted to sign or issue certificates for other people or entities. The certificate authority usually has some kind of legal responsibilities for its vouching of the binding between a public key and its owner that allow one to trust the entity that signed a certificate. There are many such certificate authorities, such as VeriSign, Entrust, etc. These authorities are responsible for verifying the identity and key ownership of an entity when issuing the certificate.

If a certificate authority issues a certificate for an entity, the entity must provide a public key and some information about the entity. A software tool, such as specially equipped Web browsers, may digitally sign this information and send it to the certificate authority. The certificate authority might be a company like VeriSign that provides trusted third-party certificate authority services. The certificate authority will then generate the certificate and return it. The certificate may contain other information, such as dates during which the certificate is valid and a serial number. One part of the value provided by a certificate authority is to serve as a neutral and trusted introduction service, based in part on their verification requirements, which are openly published in their Certification Service Practices (CSP)

Typically, after the certificate authority has received a request for a new digital certificate, which contains the requesting entity's public key, the certificate authority signs the requesting entity's public key with the certificate authority's private key and places the signed public key within the digital certificate. Anyone who receives the digital certificate during a transaction or communication can then use the public key of the certificate authority to verify the signed public key within the certificate. The intention is that an entity's certificate verifies that the entity owns a particular public key.

The X.509 standard is one of many standards that defines the information within a certificate and describes the data format of that information. The "version" field indicates the X.509 version of the certificate format with provision for future versions of the standard. This identifies which version of the X.509 standard applies to this certificate, which affects what information can be specified in it. Thus far, three versions are defined. Version 1 of the X.509 standard for public key certificates was ratified in 1988. The version 2 standard, ratified in 1993, contained only minor enhancements to the version 1 standard. Version 3, defined in 1996, allows for flexible extensions to certificates in which certificates can be extended in a standardized and generic fashion to include additional information.

In addition to the traditional fields in public key certificates, i.e. those defined in versions 1 and 2 of X.509, version 3 comprises extensions referred to as "standard extensions". The term "standard extensions" refers to the fact that the version 3 of the X.509 standard defines some broadly applicable extensions to the version 2 certificate. However, certificates are not constrained to only the standard extensions, and anyone can register an extension with the appropriate authorities. The extension mechanism itself is completely generic.

Definitions for digital certificates and certificate revocation lists are specifically recited within "Internet X.509 Public Key Infrastructure Certificate and CRL Profile", IETF RFC 2459, January 1999. Other aspects of certificate processing are also standardized. For example, the Certificate Request Message Format ("Internet X.509 Certificate Request Message Format", IETF RFC 2511, March 1999) specifies a format recommended for use whenever a relying party is requesting a certificate from a certificate authority. Certificate management protocols have also been promulgated for transferring certificates ("Internet X.509 Public Key Infrastructure Certificate Management Protocols", IETF RFC 2510, March 1999). More information about the X.509 public key infrastructure (PKIX) can be obtained from the Internet Engineering Task Force (IETF) at www.ietf.org.

Figure 2:
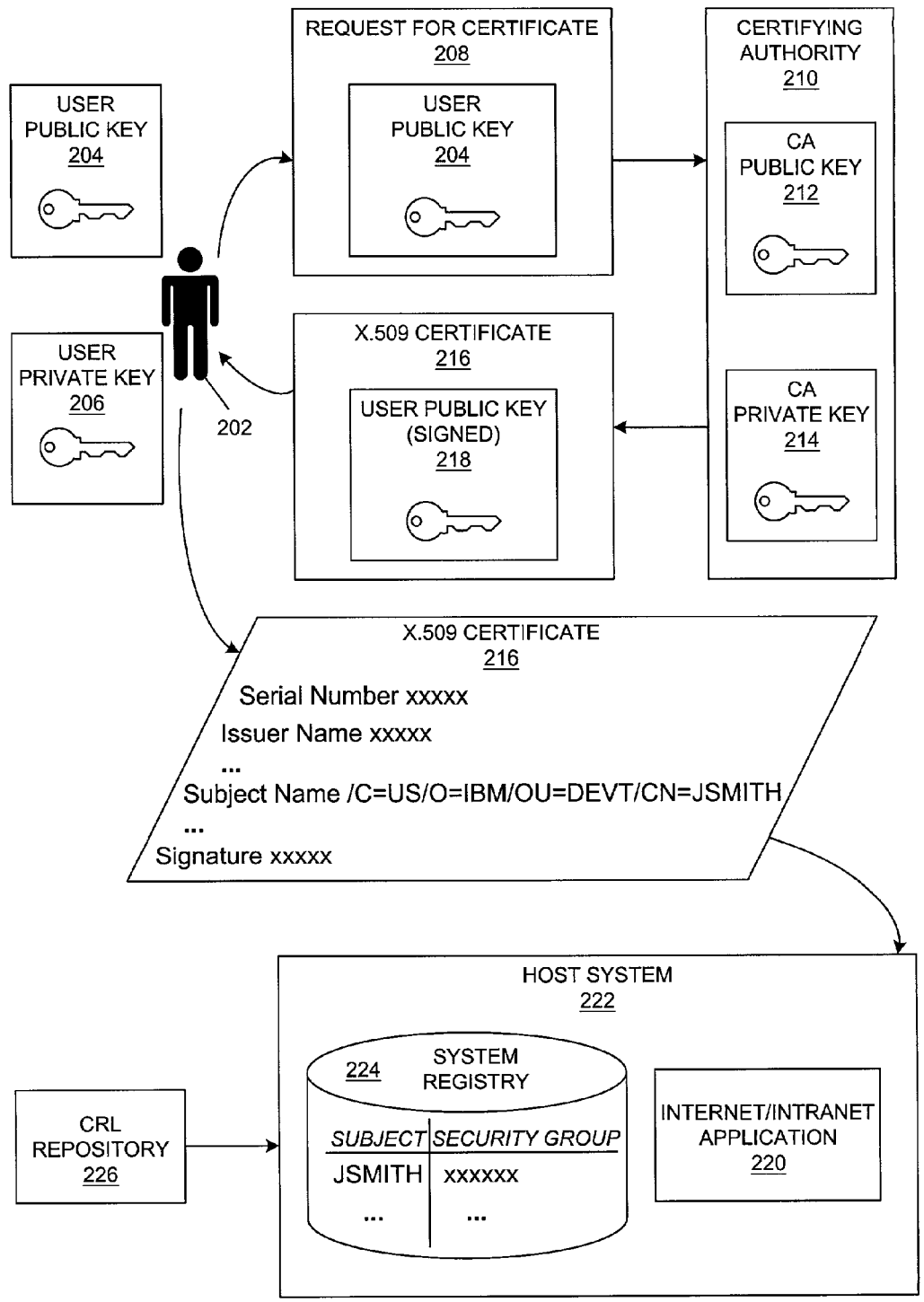
FIG. 2 depicts a typical manner in which an entity obtains and uses a digital certificate.

With reference now to FIG. 2, a block diagram depicts a typical manner in which an individual obtains and uses a digital certificate. User 202, operating on some type of client computer, has previously obtained or generated a public/private key pair, e.g., user public key 204 and user private key 206. User 202 generates a request for certificate 208 containing user public key 204 and sends the request to certifying authority 210, which is in possession of CA public key 212 and CA private key 214. Certifying authority 210 verifies the identity of user 202 in some manner and generates X.509 digital certificate 216 containing signed user public key 218 that was signed with CA private key 214. User 202 receives newly generated digital certificate 216. An entity that receives digital certificate 216 may verify the signature of the certificate authority by using CA public key 212, which is published and available to the verifying entity.

User 202 may then use its digital certificate 216 as necessary to engage in trusted transactions or trusted communications, such as to be authenticated to an Internet system or application. User 202 transmits X.509 digital certificate 216 to an Internet or intranet application 220 that comprises X.509 functionality for processing and using digital certificates in conjunction with host system 222. The entity that receives certificate 216 may be an application, a system, a subsystem, etc. Certificate 216 contains a subject name or subject identifier that identifies user 202 to application 220, which may perform some type of service for user 202.

Host system 222 may also contain system registry 224 which is used to authorize user 202 for accessing services and resources within system 222, i.e. to reconcile a user's identity with user privileges. For example, a system administrator may have configured a user's identity to belong to certain a security group, and the user is restricted to being able to access only those resources that are configured to be available to the security group as a whole. Various well-known methods for imposing an authorization scheme may be employed within the system.

In order to determine whether certificate 216 is still valid, host system 222 obtains a certificate revocation list (CRL) from CRL repository 226 and compares the serial number within certificate 216 with the list of serial numbers within the retrieved CRL. If there are no matching serial numbers and the certificate has been otherwise verified in an appropriate manner, then host system 222 authenticates user 202. If the CRL has a matching serial number, then certificate 216 should be rejected, and host system 222 can take appropriate measures to reject the user's request for access to any protected resources.

There are many commercially available systems that have been created using PKIX standards and specifications, which have been briefly described with respect to FIG. 2. With the proliferation of interconnected networks, it is expected that the PKI infrastructure will be used for many new applications. However, before two entities can complete a secure transaction after exchanging digital certificates, the participating entities need to validate each other's digital certificate via a trust path, which is explained with respect to FIGS. 3A-3B.

Figure 3A:
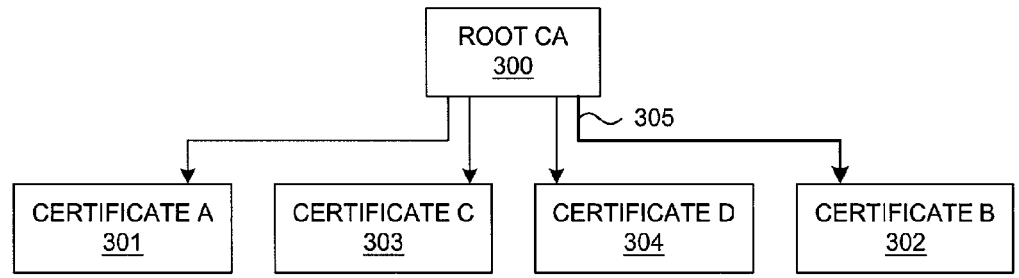
FIGS. 3A-3B are a pair of block diagrams that depict typical trust models for entities within a PKI-enabled network system.
Figure 3B:
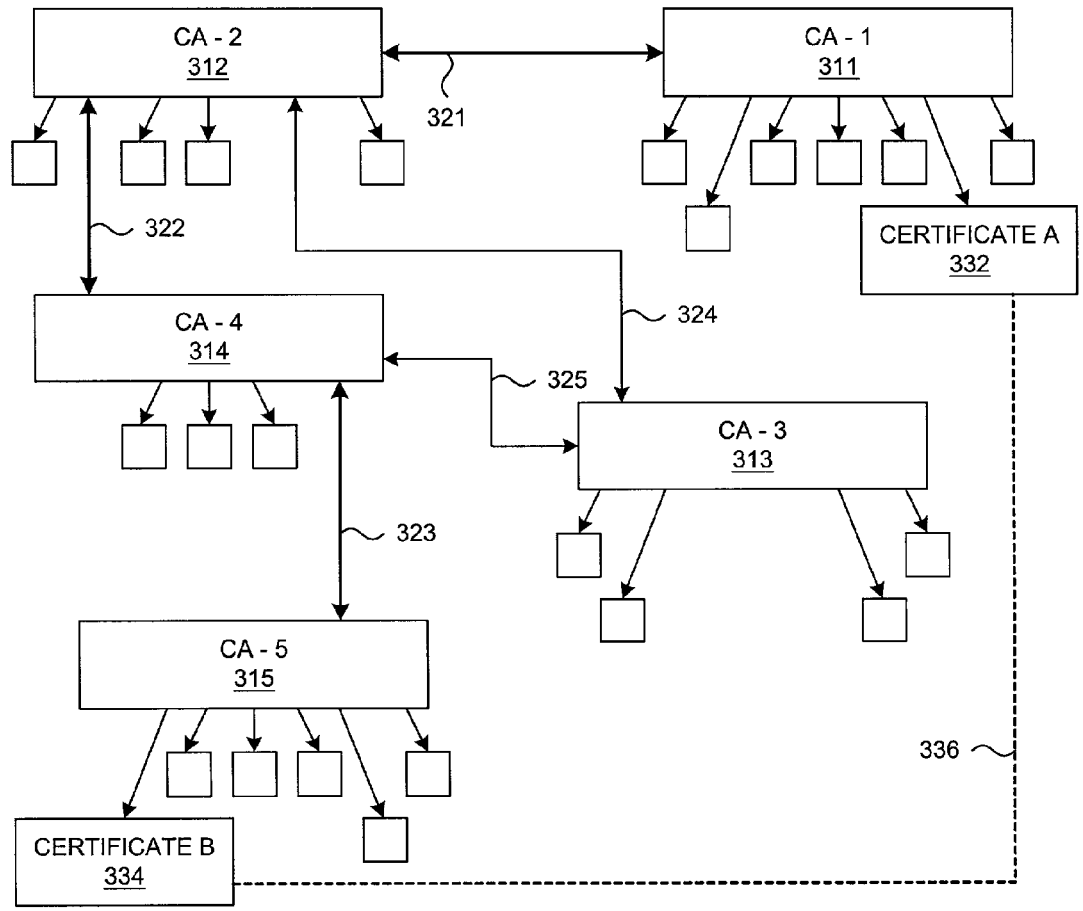

With reference now to FIGS. 3A-3B, a pair of block diagrams depict typical trust models for entities within a PKI-enabled network system. Over time, trust relationships are established between certificate authorities, which are infrequent events. These trust relationships are then used by two entities that desire to engage in a secure transaction or communication using the PKI infrastructure, which is a frequent event. The two entities exchange digital certificates, thereby providing the other entity with a public key (or with information to retrieve a public key) that is used during the secure transaction or communication. Each entity must then validate the other entity's digital certificate, and the validation process involves two primary procedures: trust path construction and trust path verification.

A trust path can be considered as a chain of individual links between trusted entities; each link between entities is represented by a digital certificate. Trust path construction consists of computing a chain of certificates from the certificate authority that is trusted by a first entity to the certificate authority that is trusted by a second entity. The result of constructing a trust path shows that a potentially trustable relationship exists between the first entity and the second entity.

After the potential trust path has been constructed, then the potential trust path is verified by validating the cryptographic information within the certificates that represent the trust path. In other words, the digital signature within each certificate should be verifiable. Alternatively, the verification process may be performed in parallel with the trust path construction process, although it may be more efficient to construct the trust path prior to engaging in the computational effort to verify signatures.

After the trust path has been verified, the secure transaction or communication may be performed. The entire certificate validation process verifies the binding between the name/identity of the entity that has attempted to use a certificate and that entity's public key.

A link between trusted entities can be established by obtaining the information that links the two entities within a certificate. Each digital certificate contains information about the owner of the certificate, e.g., a "subject" data field, and information about a certificate authority that issued the certificate, e.g., an "issuer" data field. These information items act as a form of pointer between two linked entities, and these links can be "walked" by obtaining a name or an identifier for an entity from a certificate and then obtaining another certificate that is also associated with the entity. Assuming that the certificates are stored within LDAP directories, LDAP queries are issued to retrieve certificates that contain information that match the subject identifiers or issuer identifiers that are being processed by a validating entity.

From the perspective of the entity that is validating a certificate, i.e. a validating entity, all valid trust paths begin with the certificates that are issued by the validating entity's "most-trusted certificate authority" (using the terminology of RFC 2459), also known as a "trust anchor", which is typically designated as a matter of policy that is correlated with the trust model in which the validating entity is operating. An organization of entities can be described using two primary models: a hierarchical model and a horizontal (peer-to-peer) cross-certifying model. In the hierarchical model, the validating entity's "most-trusted certificate authority" may be the certificate authority that issued the validating entity's own certificate or a so-called "root CA". In the cross-certification model, the validating entity's "most-trusted certificate authority" may be the certificate authority that issued the validating entity's own certificate or any other certificate authority within a network, web, or mesh of certificate authorities.

Referring to FIG. 3A, a block diagram depicts a simple hierarchical model for entities within a PKI-enabled system. A validation application can ascend the relationships within a trust hierarchy by retrieving certificates that have a "subject" field that matches the "issuer" field of the certificate that is currently being examined by the validation application. A validation application can descend the relationships within a trust hierarchy by retrieving certificates that have an "issuer" field that matches the "subject" field of the certificate that is currently being examined by the validation application.

Root CA 300 issues certificates for users within a given hierarchy, who own one or more certificates 301-304. Typically, the root certificate authority is the trust anchor for all of the users within a particular hierarchy. In this example, an entity that is associated with certificate A 301 can determine trivial trust path 305 to an entity that is associated with certificate B 302 because they both have the same root CA, which would be identified within each of their certificates.

The example that is shown in FIG. 3A is simplified by not including any subordinate certificate authorities. If one or more subordinate certificate authorities were included, then a trust path between two entities would be constructed by verifying that the two certificate authorities that issued their certificates have a common root certificate authority. A root certificate authority can control the policy of whether a subordinate certificate authority can certify another subordinate certificate authority in the hierarchy below itself; the root certificate authority can revoke the abilities of the subordinate certificate authorities. For example, in a large enterprise, a root certificate authority may be controlled by the main corporate office while each division may have a subordinate certificate authority that operates locally yet is controlled by the root certificate authority. In general, the hierarchical model is more suitable for a large organization that has a hierarchical structure that can be easily mapped to the hierarchical model.

Referring to FIG. 3B, a block diagram depicts a peer-to-peer cross-certification model for entities within a PKI-enabled system. In this model, certificate authorities cross-certify each other, which gives rise to a mesh of possible trust paths. Cross-certifying entities may use specially designated cross-certification certificates or specially designated data fields within typical certificates. Hence, in addition to walking up and down hierarchical relationships between entities in the PKI-enabled system, as described above with respect to FIG. 3A, a validation application may walk across horizontal or peer relationships between entities.

Certifying authorities 311-315 have previously established a mesh of trust relationships 321-325 as follows: certificate authority 311 and certificate authority 312 have trust relationship 321; certificate authority 312 and certificate authority 314 have trust relationship 322; certificate authority 314 and certificate authority 315 have trust relationship 323; certificate authority 312 and certificate authority 313 have trust relationship 324; certificate authority 314 and certificate authority 313 have trust relationship 325.

Two entities that desire to engage in a secure communication or transaction are associated with either certificate 332 or certificate 334. Focusing on the perspective of the entity associated with certificate 332, this entity needs to discover trust relation 336 between certificates 332 and 334; as a preliminary step, the validating entity needs to construct a trust path between the certificate authorities that issued certificates 332 and 334. After constructing the trust path, the validating entity would discover that the trust path comprises trust relations (trust links) 321, 322, and 323.

In this example, cross-certification implies that end-entity certificates issued in the domain controlled by certificate authority 311 can be trusted by end-entity certificates operating in the domain governed by certificate authority 315. If FIG. 3B were representing a type of hybrid model, each certificate authority 311-315 could be a root certificate authority for a hierarchical certification scheme within its own organization.

The example that is shown in FIG. 3B does not reflect the fact that the certificate authorities may be controlled by different organizations; typically, cross-certification occurs between organizations. Each organization would have control over the operation of its certificate authority, which may be a root certificate authority over subordinate certificate authorities within the organization. A peer-to-peer cross-certification model is more suitable for operations between organizations that require flexibility in establishing and revoking trust relationships with other organizations over long periods of time.

It should be noted, though, that both the hierarchical model and the peer-to-peer cross-certification model can be implemented in the form of one or more certification services that operate commercially across organizational boundaries. In other words, a certificate authority may be operated as a third-party service for the benefit of customers in organizations that use the service but do not control the service.

Some entities within a system may deem that they want to control transitive trust relationships such that trust is not extended "too far" or to certain entities, particularly within a cross-certification model. Hence, path constraints, name constraints, and policy constraints may be employed when constructing and/or verifying a trust path.

In a real scenario involving various electronic marketplaces, e-businesses, vendors, and users throughout the Internet, a large number of PKI domains may exchange trust relationships. As should be apparent, administrative management and processing of information associated with these trust paths can be quite complex, yet the deployment of a standard public key infrastructure is already hampered by the cost of the complexity of the public key infrastructure. Moreover, the construction of a trust path can be computationally expensive in a large trust mesh, although the PKIX standards and specifications do not require the use of any particular certificate validation algorithm.

As mentioned above, the establishment of a trust relationship is an infrequent event, but the use of those trust relationships is a frequent event. It is inefficient to construct a trust path each time a digital certificate needs to be used. The present invention is directed to an efficient technique for trust path construction as explained in more detail with respect to the remaining figures.

Figure 4:
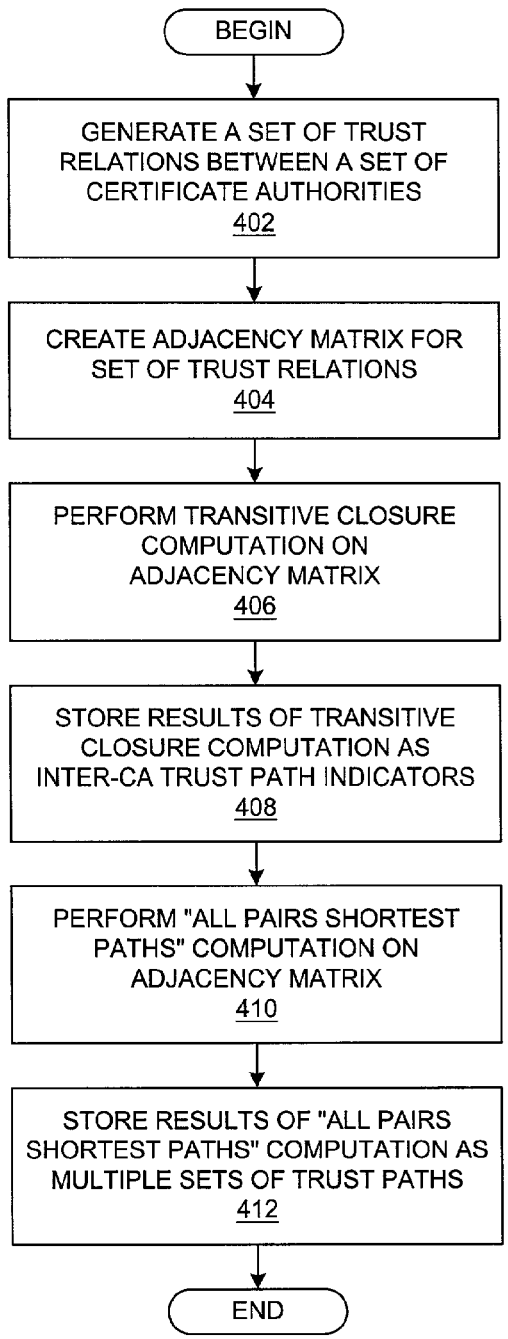
FIG. 4, a flowchart depicts a process for computing a trust path in accordance with the present invention

With reference now to FIG. 4, a flowchart depicts a process for computing a trust path in accordance with the present invention. The present invention represents the trust relationships between certificate authorities as edges of a directed graph. Each node in the directed graph represents a certificate authority, and the set of edges between nodes represent a trust web; each edge represents a trust relation, i.e. a certification from one certificate authority to another certificate authority. This representation is applicable to both the hierarchical model, the peer-to-peer cross-certification model, or even a hybrid model.

The process begins by generating a set of trust relations between a set of certificate authorities (step 402). As noted above, an application can traverse the information in a set of certificates in a manner that resembles a process of following the links of a chain or a process of walking a path; these certificates may be held privately or obtained via an LDAP directory into which the certificates have been published.

The set of trust relations are then used to create an adjacency matrix (step 404). Assuming that there are "N" entities in the set of entities that are represented by a directed graph, an adjacency matrix is an N-by-N (N×N) matrix in which each row and each column represent the existence of an entity. In the present invention, the entities are certificate authorities; each cell in the adjacency matrix at the intersection of a row and column represents the existence of a relation between the corresponding certificate authorities.

The transitive closure is then computed over the adjacency matrix (step 406). The transitive closure represents whether there is a path, i.e. set of edges, through the directed graph for any two nodes in the directed graph. Hence, the transitive closure can also be represented with a matrix with each cell reflecting whether or not there is a path between the entities that correspond to the row and the column for the cell.

Several algorithms exist for computing the transitive closure matrix from an adjacency matrix; "Warshall's algorithm" is frequently used for this type of computation, which is also known as solving the reachability problem for a set of nodes in a graph.

The present invention recognizes that a transitive closure computation can be applied to a trust web. The output of a transitive closure computation represents whether or not an established trust path exists between two certificate authorities that are involved in a certificate validation process; this output information may be termed "inter-CA trust path indicator information" as it quickly indicates whether or not a trust path exists between two certificate authorities. The result of the transitive closure computation is then stored in an appropriate format (step 408), e.g., a simple file containing the matrix, one or more database records, or some other format.

An "all pairs shortest paths" computation is then performed on the adjacency matrix (step 410). The shortest paths that are discovered during the "all pairs shortest paths" computation are then stored in an appropriate format (step 412), e.g., a simple file containing a set of paths, a set of files containing a vector representing a path, a set of linked list data structures, a set of one or more database records, or some other format. The "all pairs shortest paths" computation is described in more detail below.

Figure 5A:
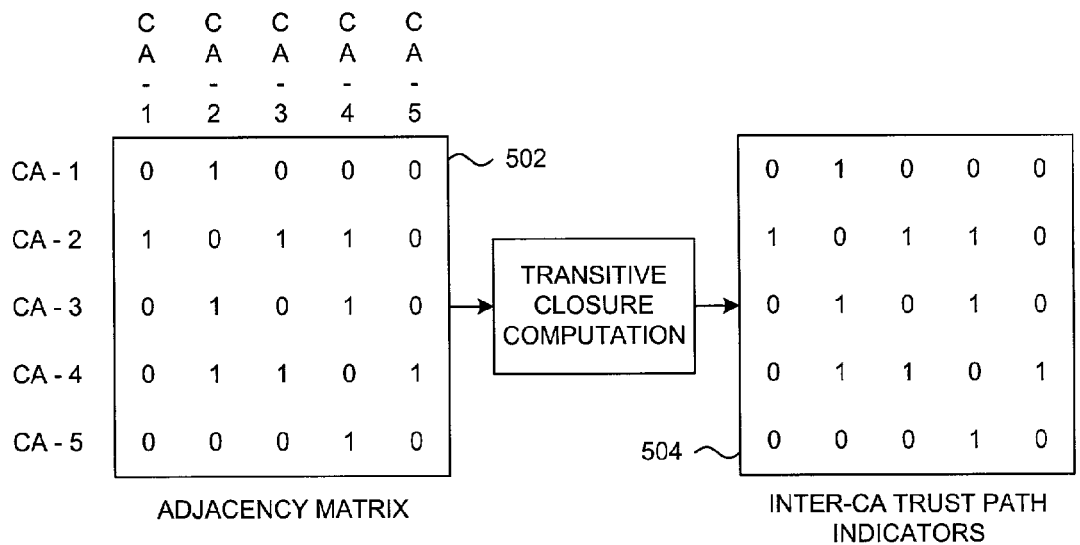
FIGS. 5A-5B are diagrams that depict the transitive closure computation and the "all pairs shortest paths" computation including an adjacency matrix that is used as input to the computations and the resulting matrices that are output from the computations.
Figure 5B:
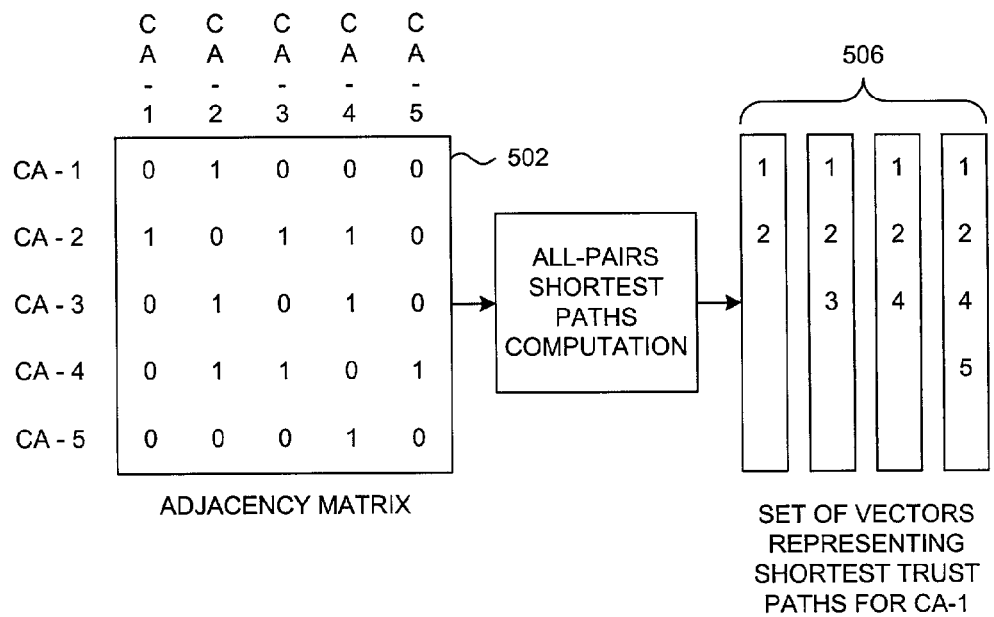

With reference now to FIGS. 5A-5B, the transitive closure computation and the "all pairs shortest paths" computation are depicted using an adjacency matrix that is used as input to the computations and the resulting matrices that are output from the computations.

In one embodiment of the present invention, an adjacency matrix might represent only the existence of relations between nodes in a directed graph. In other words, a simple adjacency matrix might have cells in which a value of "0" in a cell represents the non-existence of a relation between the corresponding nodes for the cell and a value of "1" represents the existence of a relation. In the present invention, the cells along the diagonals of this type of adjacency matrix are filled with zeroes because a trust relation between a certificate authority and itself is not represented, although in the realm of digital certificates, a certificate authority can be viewed as "self-certifying".

Referring to FIG. 5A, adjacency matrix 502 is depicted for the set of certificate authorities that are shown in FIG. 3B. Using this adjacency matrix, the transitive closure computation produces an output matrix in which each cell reflects whether or not there is a path between the entities that correspond to the row and the column for the cell. With respect to the present invention, output matrix 504 from the transitive closure computation represents a set of inter-CA trust path indicators that reflect whether or not there is a path between the corresponding certificate authorities.

In typical operations with adjacency matrices, an adjacency matrix represents not only the existence of relations between nodes in a directed graph but also weight values that are assigned to the edges that represent those relations. These weights can represent various costs that might be associated with those relations. In such cases, an adjacency matrix has cells in which the values typically have the following meanings: a value of "0" in a cell represents no costs because there is typically no relation between a node and itself and, therefore, no associated cost; a non-zero value is the cost of the relation between the corresponding nodes for a cell; and an infinite or undefined cost represents that there is no relation between the corresponding nodes for a cell, which can be viewed as representing no limit to the amount of cost that would be associated with relating two entities, thereby voiding or negating any result that attempts to have a path that directly links the two nodes. In such cases, assuming that a given directed graph has "N" nodes, the "all pairs shortest paths" computation produces an N-by-N (N×N) matrix containing the costs associated with a path from one node in the given directed graph to another node in the directed graph.

This form of adjacency matrix with weighted edges is useful because one may be concerned with various factors or characteristics that are associated with the entities that are represented by a node in the directed graph. For example, a set of emergency response teams may know all of the locations of refineries within a given region, and in order to be prepared to respond to an emergency at a refinery in the shortest amount of time, the emergency response teams might solve an "all pairs shortest paths" computation in which the nodes in a directed graph represent not only the locations of the refineries and the response team stations but also the intersections of major routes at which a response team may encounter traffic congestion. The weights of the edges in this type of adjacency matrix might represent distance along a given route or travel time along a given route, which might not be directly related to the distance along a given route because of many non-linear factors. After completing the "all pairs shortest paths" computation, each cell in the output matrix contains the relative costs that are associated with a path between corresponding nodes, i.e. between the stations, intersections, or refineries. In this example, the values of most interest are the costs between the stations and the refineries.

The example of the emergency response teams is useful for explaining that the term "all pair shortest paths" is somewhat of a misnomer in some cases. In a typical adjacency matrix, the weights that are assigned to the edges of a graph can be interpreted as distances between the nodes. Hence, when the "all pairs shortest paths" computation is performed, one can interpret the result as the shortest distance or "shortest path" between each pair of nodes. However, a more general interpretation would use a more appropriate term such as "all paths lowest costs" in which "costs" is also given the generalized definition of "use of resources".

Several algorithms exist for computing the "all pairs shortest paths" matrix from an adjacency matrix; "Floyd's algorithm" is frequently used for this type of computation. Alternatively, "Dijkstra's algorithm" can be used to solve a "single source shortest path" computation by starting at a particular node and then repeating the computation by starting at each node in turn, although "Floyd's algorithm" is more efficient for computing the "all pairs shortest paths" problem, also known as the "multiple source shortest paths" problem.

One advantage of the present invention is that it recognizes that an "all pairs shortest paths" computation can be applied to a trust web, even though there are relatively no variable costs associated with a trust relation between certificate authorities. Although the cryptographic computations that are associated with verifying a particular certificate represent a cost in the form of computer resources, it may be assumed that the amount of time and effort for the verification process do not vary over a set of certificates or vary only negligibly, even if the set of certificates indicate the use of different digest algorithms, etc. Hence, the output from an "all pairs shortest paths" computation can represent the shortest trust path (or one of a plurality of equally short paths) between two certificate authorities that are involved in a certificate validation process. The shortest trust path is then saved for subsequent re-use such that a trust path between two certificate authorities does not need to be reconstructed until the set of trust relations for a given certificate authority has changed, as explained in more detail below.

As noted above, the validation of a certificate comprises the procedures of trust path construction and then trust path verification. Since the verification costs for a trust path through a set of certificates is directly related, i.e. varies linearly, with the number of certificates to be verified, when one uses the shortest path that was previously constructed with the present invention in subsequent verification processes, one is implicitly using the least amount of computational resources during the verification process.

These advantages are discussed at this point to emphasize that the present invention is not concerned with costs in the manner that is typically associated with algorithms that solve a typical "all pairs shortest paths" computation. With respect to the present invention, when using an adjacency matrix as input to an algorithm that solves the "all pairs shortest paths" computation, one can assign the same value or weights to each edge in the directed graph that represents the trust relations between certificate authorities. In other words, each trust relation is represented in the directed graph with an edge that is assigned the same weight or "distance" value as all of the other edges.

As a related issue, the present invention is not concerned with the typical N×N matrix that is output by an algorithm that solves the "all pairs shortest paths" computation; the present invention is concerned with the actual paths that are determined to have the lowest costs during the "all pairs shortest paths" computation, i.e. the paths themselves that give rise to the lowest costs. It is well-known that an algorithm that solves the "all pairs shortest paths" computation can also produce, as a by-product, a vector that represents the actual path along the nodes whose intermediary edges have produced the lowest cost, i.e. shortest path or "distance", for a given pair of nodes; over multiple pairs of nodes, multiple sets of paths can be produced with one set of paths for each pair of nodes.

Hence, as noted above with respect to step 412 in FIG. 4, the output from the "all pairs shortest paths" computation can be a set of paths. For an N×N adjacency matrix, a set of "N(N−1)" paths could be produced because one is not concerned with a path from a node to itself. In one embodiment, these paths could be represented with a matrix of paths. In another embodiment, each path might be represented by a vector of maximum length "N", which assumes that the starting node is included in the path.

Referring to FIG. 5B, adjacency matrix 502 is again depicted for the set of certificate authorities that are shown in FIG. 3B. Using this adjacency matrix, the "all pairs shortest paths" computation produces a set of shortest paths. With respect to the present invention, the output is a set of vectors for each certificate authority that indicates the shortest trust path to each of the other certificate authorities if such a path exists. Although multiple sets of shortest trust paths would be produced, FIG. 5B shows only vector set 506 for a single certificate authority. A shortest path always starts with the entity from which the path originates, and the starting certificate authority is shown in vector set 506.

Figure 6:
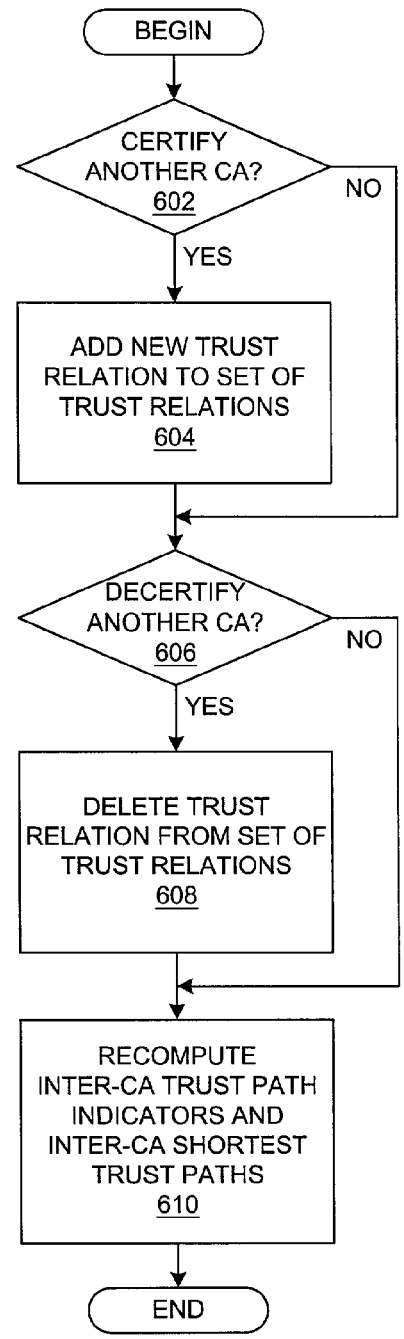
FIG. 6 is a flowchart that depicts a process for updating trust relations in accordance with the present invention.

With reference now to FIG. 6, a flowchart depicts a process for updating trust relations in accordance with the present invention. FIG. 4 describes a process by which a transitive closure matrix may be computed and by which a set of shortest paths may be computed; the process assumes that the set of trust relations between the certificate authorities are known. Over time, though, this set of trust relations may change, and the previously computed set of shortest paths and transitive closure information would need to be updated, as shown in FIG. 6, which assumes that at least one change has occurred.

The process begins by determining whether a certificate authority has certified another certificate authority (step 602). If so, then the trust relation with the newly certified certificate authority is added to the set of existing trust relations (step 604). Otherwise, a determination can be made as to whether or not a certificate authority has decertified another certificate authority (step 606). If so, then the trust relation with the newly decertified certificate authority is deleted from the set of existing trust relations (step 608). In either case, the previously computed set of shortest paths and transitive closure information are recomputed using the newly modified set of trust relations (step 610), which can be performed by the process that is shown in FIG. 4.

Figure 7:
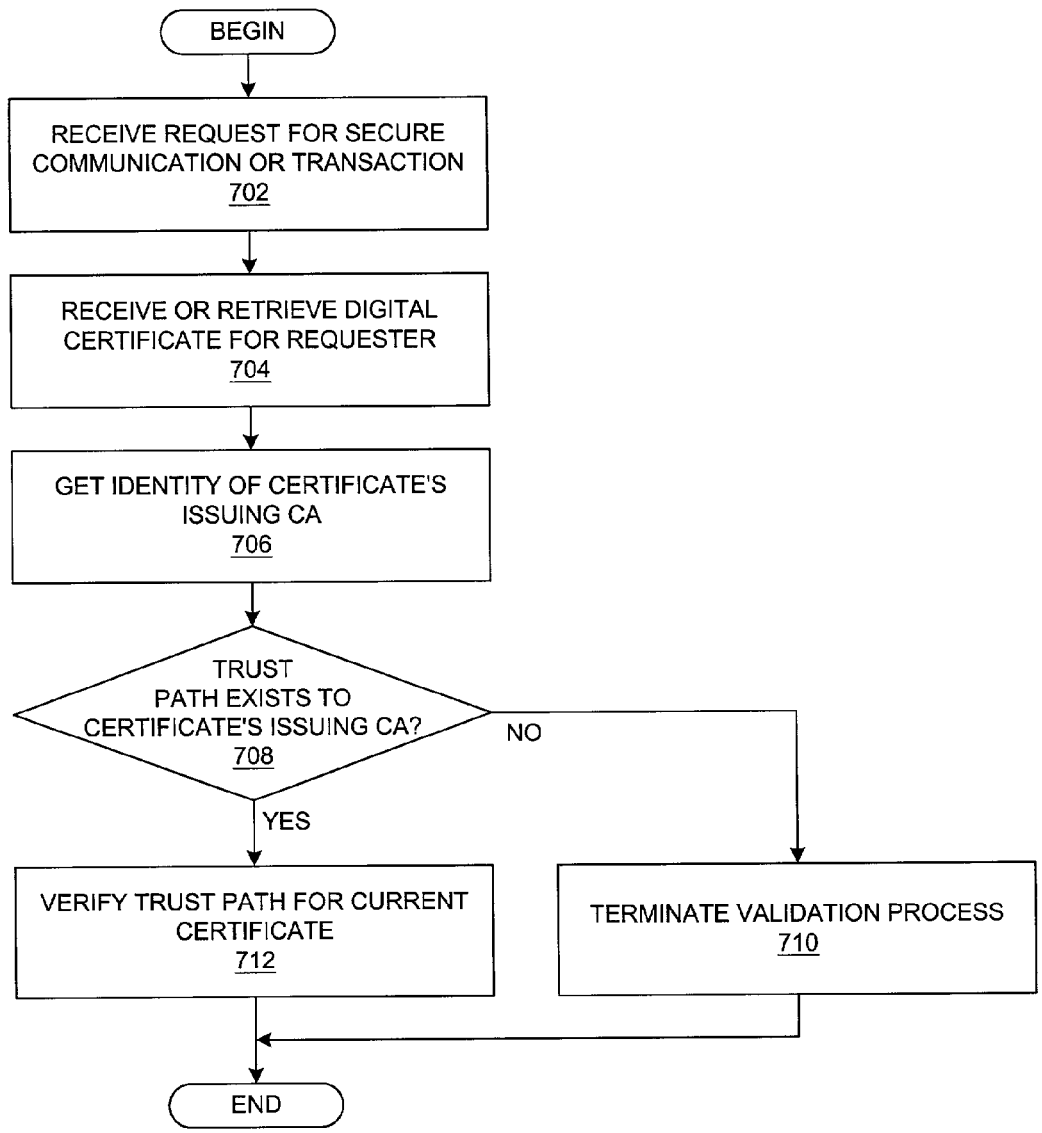
FIG. 7 is a flowchart that depicts a process of using a previously computed set of shortest paths and transitive closure information in a certificate validation process.

With reference now to FIG. 7, a flowchart depicts a process of using a previously computed set of shortest paths and transitive closure information in a certificate validation process. The process begins by receiving a request for a secure communication link or a secure transaction (step 702). The requester's digital certificate is retrieved or is also received (step 704), and issuer identity information is obtained from the digital certificate (step 706). A determination is made as to whether or not the certificate authority that issued the certificate corresponds to a certificate authority with which the validating entity has a known trust path as indicated by the previously computed transitive closure information (step 708). Additional intermediate steps may be necessary; for example, the issuer identity information may be used as in a simple lookup operation, or the identity information could be mapped to an index that is then used on the stored transitive closure matrix.

If validating entity's trust anchor is not found to have a trust path with the identified certificate authority, then validation process can be terminated immediately (step 710), thereby preventing additional computational resources from being wasted. Other alternative methods may be used in conjunction with the previously computed transitive closure information, such as checking whether a domain that corresponds to the requester's domain has a trust path with the validating entity's trust anchor.

If validating entity's trust anchor is found to have a trust path with the identified certificate authority, then validation process can be continued by verifying the trust path (step 712). In either case, the process is then complete.

The processes shown in FIG. 4 and FIG. 6 can be implemented in each certificate authority. One potential difficulty with implementing the processes shown in FIG. 4 and FIG. 6 is that each certificate authority is assumed to have knowledge about the existence of all other certificate authorities within the trust web, including those certificate authorities with which it does not have a trust relation.

Figure 8A:
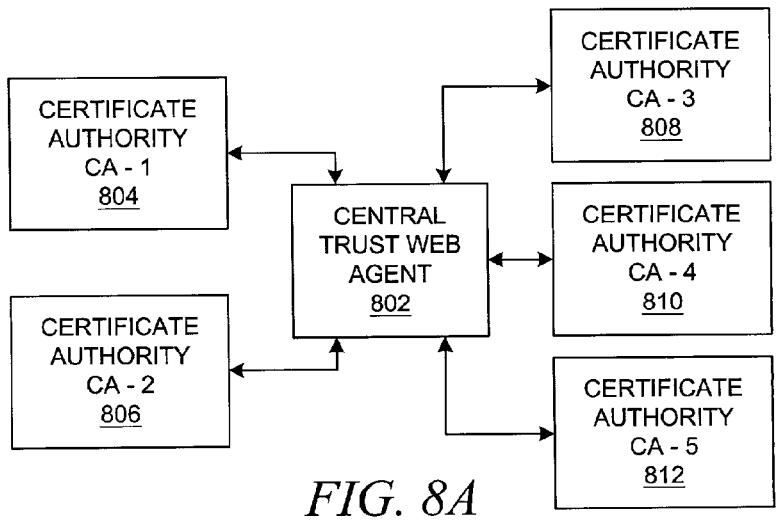
FIG. 8A is a block diagram that depicts a simple organization of a central trust web agent in accordance with the present invention.

With reference now to FIG. 8A, a block diagram depicts a simple organization of a central trust web agent in accordance with the present invention. Rather than assume that each certificate authority has knowledge about the existence of all other certificate authorities within the trust web, the responsibility for managing the trust relation information for a particular trust web is delegated to a central trust web agent. FIG. 8A shows a trust web from the limited perspective of central trust web agent 802, which is connected to a set of certificate authorities 804-812 in a hub-and-spoke manner.

Figure 8B:
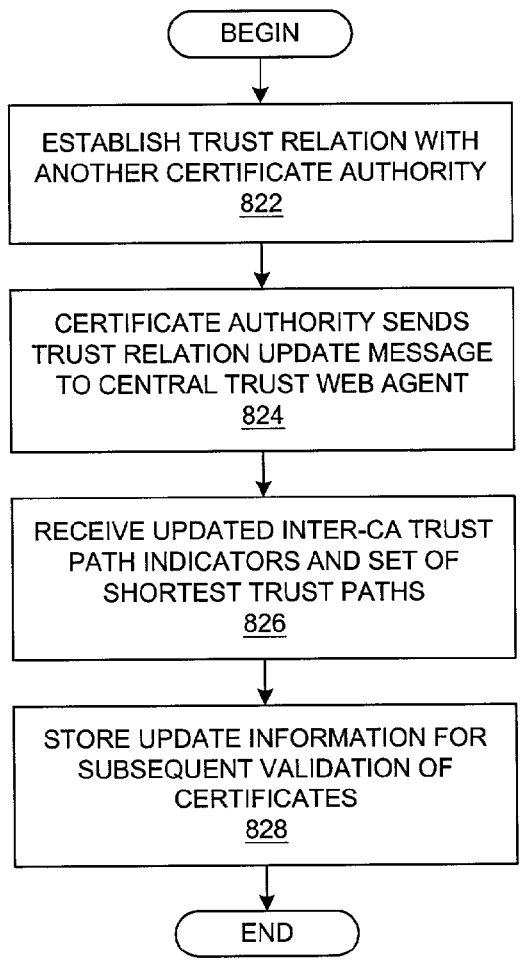
FIG. 8B is a flowchart that depicts a process through which a certificate authority coordinates its trust relations with a central trust web agent.

With reference now to FIG. 8B, a flowchart depicts a process through which a certificate authority coordinates its trust relations with a central trust web agent. The process begins when a certificate authority establishes a trust relation with another certificate authority (step 822). This occurs when a new certificate authority joins the trust web or when a certificate authority that is already part of the trust web certifies another certificate authority.

The certificate authority then sends a trust relation update message to the central trust web agent (step 824); in a cross-certification operation, each certificate authority would be responsible for sending such a message to the central trust web agent. In response from the central trust web agent at some later point in time, the certificate authority would receive updated adjacency information, updated inter-CA trust path indicators (updated transitive closure information), and an updated set of shortest trust paths for the trust web (step 826). The certificate authority then stores this information for later use in a certificate validation procedure (step 828), and the process is complete. In this manner, the central trust web agent assumes the responsibility for performing transitive closure computations and "all pairs shortest paths" computations for the trust web.

It should be noted that a certificate authority could receive updated information from the central trust web agent in response to an update from another certificate authority, thereby causing it to perform steps 826 and 828 without performing steps 822 and 824. This scenario could occur because, even though the certificate authority that receives this information does not have a direct trust relation with the certificate authority that caused the update, the receiving certificate authority could have a trust path with a certificate authority that established a new trust relation, which thereby affects the trust paths of the receiving certificate authority. Most certificate authorities should not be affected by a new trust relation, i.e. the effect should be localized, but it is possible that the effect could propagate throughout the trust web. This process is independent of any particular protocol that is used by the certificate authorities for establishing a new trust relation. In addition, this process is independent of any particular protocol or message format that is used to communicate information between the certificate authorities and the central trust web agent.

Figure 8C:
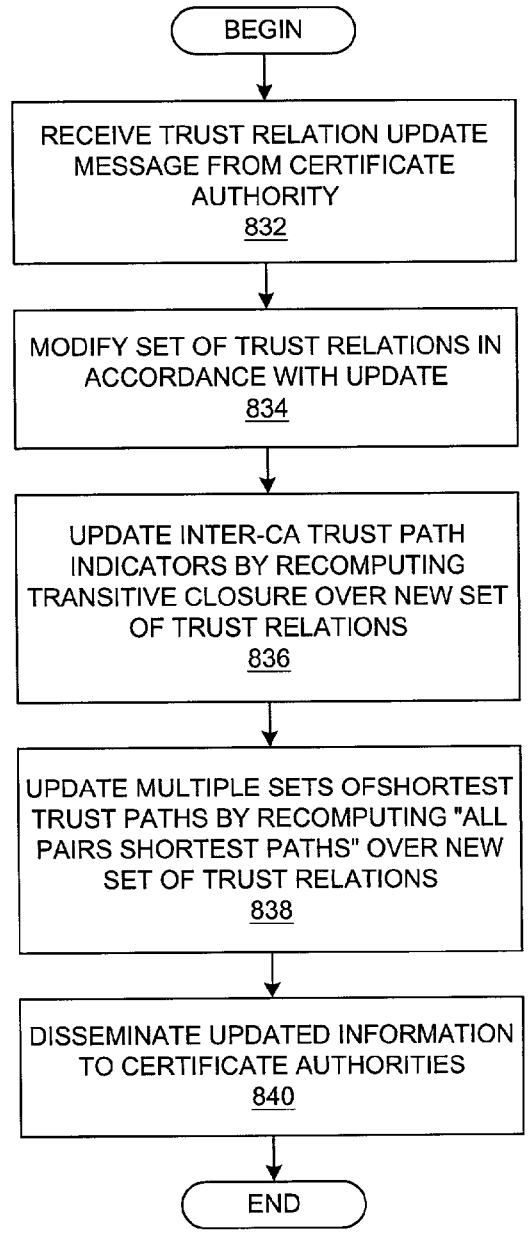
FIG. 8C is a flowchart that depicts a process by which a central trust web agent generates and disseminates trust web information to certificate authorities within a trust web.

With reference to FIG. 8C, a flowchart depicts a process by which a central trust web agent generates and disseminates trust web information to certificate authorities within a trust web. The process begins when the trust web agent receives a trust relation update message from a certificate authority (step 832), and the trust relation within the receive message is added or deleted from the current set of trust relations that is maintained by the central trust web agent (step 834). The trust web agent then performs the transitive closure computation (step 836) and also the "all pairs shortest paths" computation (step 838), after which it can store the information for later use. By comparing the newly generated transitive closure information and shortest path information with the previously generated information, the central trust web agent can determine which certificate authorities have been affected by the most recent trust relation update. Hence, the central trust web agent can communicate the appropriate updated information to the affected certificate authorities (step 840), thereby completing the process from the perspective of the central trust web agent.

In this manner, the central trust web agent may be described as generating and updating the trust paths through a greedy algorithm when any new certificate authority joins the trust web or when any certificate authority changes its trust relations, e.g., "Dijkstra's algorithm" is an example of a greedy algorithm.

It should be noted that the central trust web agent may communicate only the information that is required by a particular certificate authority. For example, since a given certificate authority does not require information about the existence of trust paths between other certificate authorities, the central trust web agent may send to a particular certificate authority only the row of the transitive closure matrix that corresponds to the given certificate authority. Similarly, the given certificate authority would only receive the set of shortest paths that originate with the given certificate authority.

It should be noted that the methodology of the present invention is generic enough to allow for its operation using a variety of message protocols and certificate repositories and that the present invention is not limited to being implemented within only the X.509 set of specifications and standards.

The advantages of the present invention should be apparent in view of the detailed description of the invention that is provided above. In the prior art, PKIX-enabled entities within a trust web may waste significant computational resources constructing trust paths during certificate validation procedures. In contrast, the present invention provides a technique reducing the effort in constructing a trust path. In addition, the processes associated with trust path construction can be delegated to an agent within a trust web such that the certificate authorities within a trust web can coordinate the efficient transfer of trust relation information amongst themselves.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for processing digital certificates within a data processing system, the method comprising:
   determining a set of trust relations between a set of certificate authorities (CAs) in a trust web;
   representing the set of trust relations in an adjacency matrix, wherein a cell in the adjacency matrix corresponds to a pair of certificate authorities;
   performing a transitive closure computation on the adjacency matrix to generate a set of inter-CA trust path indicators that represent whether a trust path exists between a pair of certificate authorities; and
   performing an all-pairs-shortest-paths computation on the adjacency matrix to generate multiple sets of shortest trust paths between the certificate authorities.

2. The method of claim 1 further comprising:
   initiating a secure communication with a requester;
   receiving a digital certificate for the requester; and
   validating the digital certificate in accordance with an inter-CA trust path indicator and/or a shortest trust path.

3. The method of claim 2 wherein the digital certificate is formatted according to X.509 standards.

4. An apparatus for processing digital certificates within a data processing system, the apparatus comprising:
   means for determining a set of trust relations between a set of certificate authorities (CAs) in a trust web;
   means for representing the set of trust relations in an adjacency matrix, wherein a cell in the adjacency matrix corresponds to a pair of certificate authorities;
   means for performing a transitive closure computation on the adjacency matrix to generate a set of inter-CA trust path indicators that represent whether a trust path exists between a pair of certificate authorities; and
   means for performing an all-pairs-shortest-paths computation on the adjacency matrix to generate multiple sets of shortest trust paths between the certificate authorities.

5. The apparatus of claim 4 further comprising:
   means for initiating a secure communication with a requester;
   means for receiving a digital certificate for the requester; and
   means for validating the digital certificate in accordance with an inter-CA trust path indicator and/or a shortest trust path.

6. The apparatus of claim 5 wherein the digital certificate is formatted according to X.509 standards.

7. A computer program product in a computer-readable medium for use in a data processing system for processing digital certificates, the computer program product comprising:
  instructions for determining a set of trust relations between a set of certificate authorities (CAs) in a trust web;
  instructions for representing the set of trust relations in an adjacency matrix, wherein a cell in the adjacency matrix corresponds to a pair of certificate authorities;
  instructions for performing a transitive closure computation on the adjacency matrix to generate a set of inter-CA trust path indicators that represent whether a trust path exists between a pair of certificate authorities; and
  instructions for performing an all-pairs-shortest-paths computation on the adjacency matrix to generate multiple sets of shortest trust paths between the certificate authorities.

8. The computer program product of claim 7 further comprising:
  instructions for initiating a secure communication with a requester;
  instructions for receiving a digital certificate for the requester; and
  instructions for validating the digital certificate in accordance with an inter-CA trust path indicator and/or a shortest trust path.

9. The computer program product of claim 8 wherein the digital certificate is formatted according to X.509 standards 10. A method for operating certificate authorities within a data processing system, the method comprising:
  receiving at a central trust web agent from a certificate authority (CA) a trust relation update message, wherein the central trust web agent processes trust relation information for a set of authorities within a trust web, and wherein the trust relation update message indicates a change in a set of trust relations for the certificate authority;
  modifying a set of trust relations for the set of certificate authorities within the trust web based on an indicated request in the trust relation update message;
  sending to the certificate authority from the central trust web agent a set of inter-CA trust path indicators that represent whether a trust path exists between the certificate authority and other certificate authorities in the trust web;
  sending to the certificate authority from the central trust web agent a set of shortest trust paths between the certificate authority and other certificate authorities in the trust web:
  representing the set of trust relations in an adjacency matrix, wherein a cell in the adjacency corresponds to a pair of certificate authorities;
  performing a transitive closure computation on the adjacency matrix to generate a set of inter-CA trust path indicators that represent whether a trust path exists between a pair of certificate authorities; and
  performing an all-pairs-shortest-paths computation on the adjacency matrix to generate multiple sets of shortest trust paths between the certificate authorities.

11. An apparatus for processing information related to operations of certificate authorities within a data processing system, the apparatus comprising:
  means for receiving at a central trust web agent from a certificate authority (CA) a trust relation update message, wherein the central trust web agent processes trust relation information for a set of authorities within a trust web, and wherein the trust relation update message indicates a change in a set of trust relations for the certificate authority;
  means for modifying a set of trust relations for the set of certificate authorities within the trust web based on an indicated request in the trust relation update message;
  means for sending to the certificate authority from the central trust web agent a set of inter-CA trust path indicators that represent whether a trust path exists between the certificate authority and other certificate authorities in the trust web;
  means for sending to the certificate authority from the central trust web agent a set of shortest trust paths between the certificate authority and other certificate authorities in the trust web;
  means for representing the set of trust relations in an adjacency matrix, wherein a cell in the adjacency corresponds to a pair of certificate authorities;
  means for performing a transitive closure computation on the adjacency matrix to generate a set of inter-CA trust path indicators that represent whether a trust path exists between a pair of certificate authorities; and
  means for performing an all-pairs-shortest-paths computation on the adjacency matrix to generate multiple sets of shortest trust paths between the certificate authorities.

12. A computer program product in a computer-readable medium for use in a data processing system for processing information related to operations of certificate authorities within a data processing system, the computer program product comprising:
  instructions for receiving at a central trust web agent from a certificate authority (CA) a trust relation update message, wherein the central trust web agent processes trust relation information for a set of authorities within a trust web, and wherein the trust relation update message indicates a change in a set of trust relations for the certificate authority;
  instructions for modifying a set of trust relations for the set of certificate authorities within the trust web based on an indicated request in the trust relation update message;
  instructions for sending to the certificate authority from the central trust web agent a set of inter-CA trust path indicators that represent whether a trust path exists between the certificate authority and other certificate authorities in the trust web;
  instructions for sending to the certificate authority from the central trust web agent a set of shortest trust paths between the certificate authority and other certificate authorities in the trust web;
  means for representing the set of trust relations in an adjacency matrix, wherein a cell in the adjacency corresponds to a pair of certificate authorities;
  means for performing a transitive closure computation on the adjacency matrix to generate a set of inter-CA trust path indicators that represent whether a trust path exists between a pair of certificate authorities; and
  means for performing an all-pairs-shortest-paths computation on the adjacency matrix to generate multiple sets of shortest trust paths between the certificate authorities.

* * * * *